March 3, 1970     R. L. COOK     3,498,335

SELF-CLOSING TUBE

Filed June 13, 1968     2 Sheets-Sheet 1

INVENTOR.
RICHARD L. COOK

BY

ATTORNEY

March 3, 1970  R. L. COOK  3,498,335
SELF-CLOSING TUBE
Filed June 13, 1968  2 Sheets-Sheet 2

INVENTOR.
RICHARD L. COOK
BY
ATTORNEY

United States Patent Office 3,498,335
Patented Mar. 3, 1970

3,498,335
SELF-CLOSING TUBE
Richard L. Cook, Flagstaff, Ariz., assignor to The Goodyear Tire & Rubber Company, Akron, Ohio, a corporation of Ohio
Filed June 13, 1968, Ser. No. 736,713
Int. Cl. F16l 11/12, 11/08, 55/10
U.S. Cl. 138—178                     8 Claims

ABSTRACT OF THE DISCLOSURE

A self-closing tube for use as a fuel line and for carrying other liquids. The various layers of the tube permits high elongation and reduction in tube diameter to completely close off the flow of fluid through the tube before the tube breaks in two or ruptures. The tube has a fluid impervious liner, an interwoven reinforcing sheath surrounding the liner, a stabilizer layer surrounding the reinforcing sheath, and a constrictor sheath which greatly reduces the tube diameter upon extensive elongation of the tube thereby closing off the interior passage within the tube to prevent fluid loss from the tube when it breaks due to excess of elongation.

---

This invention relates to a self-closing tube for carrying fuel or other liquids. The tube is designed to completely close off the interior passage within the tube upon excessive elongation thereof which is likely to cause the tube to rupture or break in two.

PRIOR ART

The closest prior art known to the applicant are Patents No. 1,779,718 issued to A. L. Thurston; No. 2,308,347 issued to B. Wilkenson et al.; and No. 2,574,416 issued to H. E. Rose.

The Wilkenson patent shows a reinforced fuel line which has a layer of rubber having the property of swelling when in contact with gasoline or similar fuel. This type of tube is self-closing primarily only when it is punctured by a bullet or other small projectile but is not self-sealing when the tube is completely broken in two.

The Rose patent shows a special cutoff valve which automatically diverts the flow of fuel from a ruptured line to one that is not ruptured.

The Thurston patent shows a radiator system for mounting in an airplane wing in which individual segments of the radiator can be isolated when a puncture occurs to prevent leakage of the radiator fluid.

OBJECTS OF THE INVENTION

The primary object of this invention is to provide a tube for carrying liquids which, when subjected to high elongation, will automatically close off the inner passage thereof, thereby preventing loss of fluid from the tube if it breaks because of high elongation.

Another object of the invention is to provide a tube for carrying liquids which may be subjected to extremely high elongation before a rupture will occur.

Another object of the invention is to provide a means of positively locking the tube in a closed position so that when the tube breaks, the broken ends thereof will remain closed.

These and other objects of the invention will become more apparent as the description proceeds in the following specification and the attached drawings.

DESCRIPTION OF THE PREFERRED EMBODIMENTS

Figure 1:
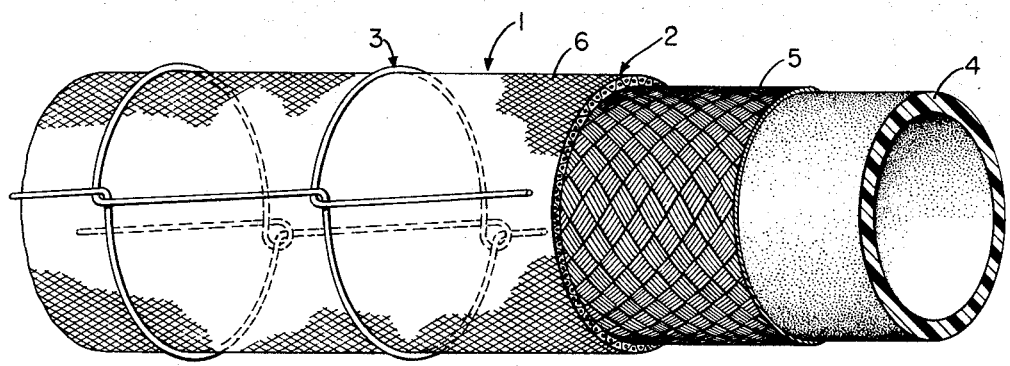
FIGURE 1 is a fragmentary view showing a section of the self-closing tube of the invention with portions broken away to show the various layers thereof.

Referring now to FIGURE 1 of the drawings, a self-closing tube is indicated generally by the numeral 1. The tube 1 is comprised of a fluid impervious conduit 2 surrounded through its length by a constrictor sheath 3. The conduit 2 is capable of high elongation with a simultaneous decrease in diameter. The conduit 2 has a fluid impervious liner 4 which is made preferably of polyurethane. A reinforcing sheath 5 made of interwoven or braided wire mesh surrounds the liner 4. The individual wires of the mesh are arranged in such manner that substantially half of the wires pass helically around the liner 4 in one direction, and the other half of the wires pass helically around the liner 4 in the opposite direction. This configuration provides the reinforcing sheath with high elongation capabilities so that when the liner 4 is stretched, the sheath 5 can also elongate a comparable amount. Surrounding the sheath 5 is a stabilizer layer 6 made preferably of nylon cloth impregnated with urethane. This layer also has high elongation capabilities so that it may also stretch along with liner 4 and the reinforcing sheath 5. Normally, all the layers of the conduit 2 are firmly clamped in an end fitting such as that shown in FIGURE 4. The manner in which the tube 1 is attached to the end fittings will be described in detail later in the specification.

Figure 2:
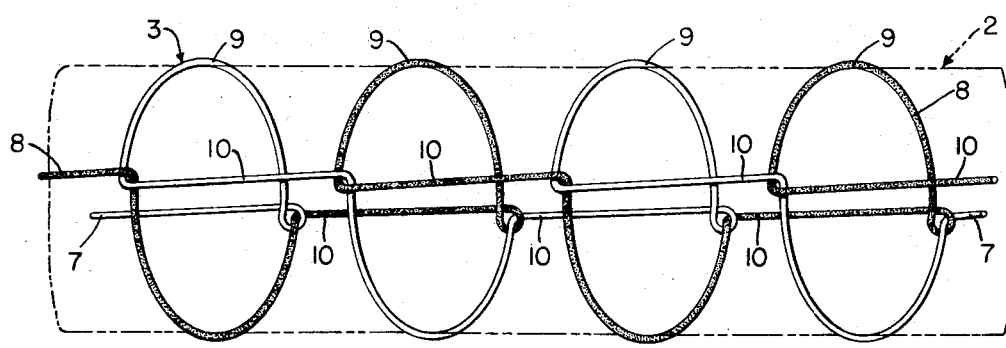
FIGURE 2 is a fragmentary view which shows a segment of the constrictor sheath as it normally appears in its open position when surrounding a tube.
Figure 3:
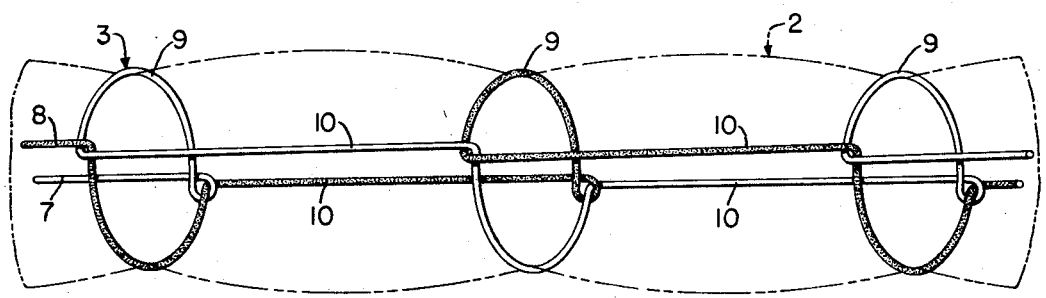
FIGURE 3 is a fragmentary view showing the same type of constrictor sheath after elongation of the tube which it surrounds and with the constrictor in a closed position.

Referring now to FIGURES 1 through 3, the constrictor 3 is shown wrapped around the conduit 2 in the particular manner indicated in the drawings. To more specifically describe the pattern of the constrictor sheath 3, it may be identified as a dual strand half hitch locking device. In FIGURE 2, in order to more clearly show the relationship of one dual strand to the other, strand 7 is indicated by a double line, and strand 8 is indicated by a single heavy line. It may be seen that the loop pattern of each of the strands 7 and 8 is repeated on every other loop 9 passing circumferentially around the conduit 2 indicated by a chain dotted line. By comparing FIGURE 2 with FIGURE 3, the action of the constrictor sheath 3 may be readily observed. As the tube 2 and the sheath 3 are simultaneously stretched, the circumferential loops 9 contract radially inwardly and cause a reduction in diameter of the conduit 2 in the area of the loops 9. The interconnecting strands 10 between the loops elongate due to the retraction of the loops 9 so that as the loops 9 are shortened, part of each loop becmes part of an interconnecting strand 10.

It should be stressed that the tube 1 should normally be capable of elongation to at least from 5 to 10 times its original length prior to failure. Repeatedly applied tensile and flexural loads must elongate the fuel line until it reaches its maximum elongation at which time, it will be fully closed and locked so that no fuel loss can occur.

The internal pressure in the tube and the amount of elongation of the tube 1 will, of course, vary somewhat depending upon the particular use for which the tube is designed.

Figure 4:
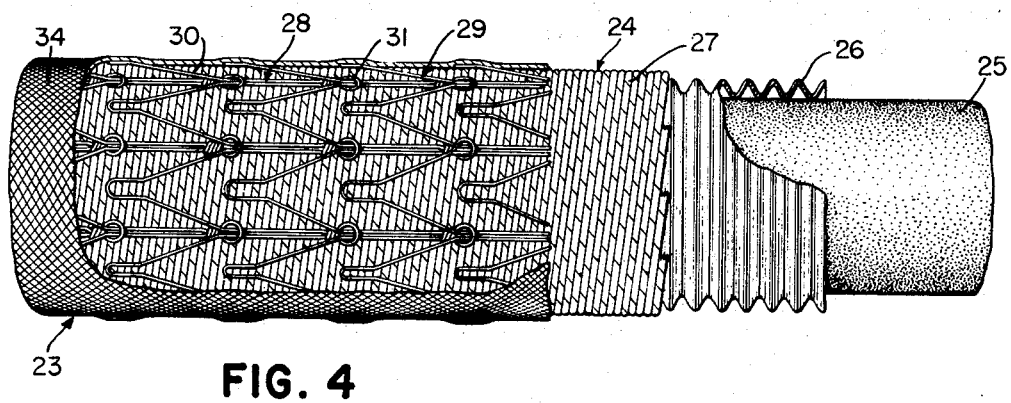
FIGURE 4 shows another embodiment of the invention utilizing a different type of constrictor sheath.
Figure 5:
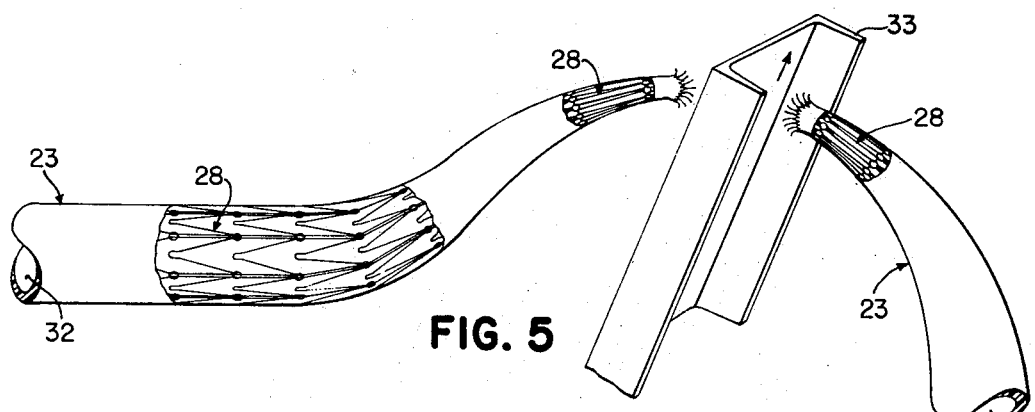
FIGURE 5 shows the tube of FIGURE 4 broken in two with the ends thereof locked in a closed position by the constrictor sheath.
Figure 6:
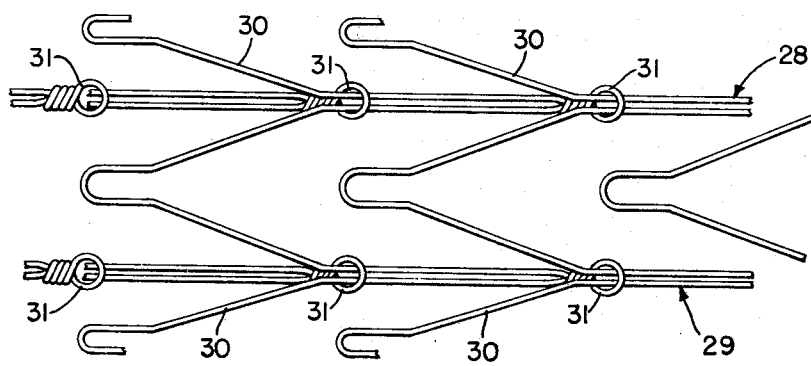
FIGURE 6 shows a fragmentary schematic view of the type of constrictor used in the embodiment shown in FIGURE 4 with the constrictor in an open position.

Another embodiment of the invention is shown in FIGURES 4 through 7 using a different type of constrictor sheath and a different layer structure for the fluid impervious conduit. Referring specifically to FIGURE 4, the entire tube is indicated generally by the numeral 23. A fluid impervious conduit 24 is made up of fluid impervious liner 25 surrounded by a crinkled sheath 26 made of urethane elastomer coated cellulose acetate tubing which is bunched together in an accordion or bellows shaped configuration to permit it to elongate when the tube 23 is stretched. An interwoven reinforcing sheath 27, similar to the sheath 5 in FIGURE 1, surrounds the crinkled sheath 26. A constrictor sheath 28 surrounds the reinforcing sheath 27. The construction of the constrictor sheath 28 is best illustrated in FIGURE 6 wherein a plurality of ring segments 29 are joined together throughout the length of each tube on which they are mounted. Each ring segment 29 is made up of a continuous wire bent in an undulating pattern to form the configuration of a plurality of interconnected "Y" shaped members 30, each one having a twisted loop 31 through which one of the Y-shaped members 30 the next adjacent ring segment 29 passes. It may be seen that as the tube 23 and the constrictor sheath 28 are elongated, each of the Y shaped members 30 is pulled through its respective loop 31 thereby drawing together the open arms of the Y-shaped member and causing the constrictor sheath 28 to tighten around the conduit 24 and close off the interior passage 32 to prevent fluid flow therethrough prior to the breaking of the tube 23 by the stretching and shearing action of a channel member 33, as shown in FIGURE 5.

Figure 7:
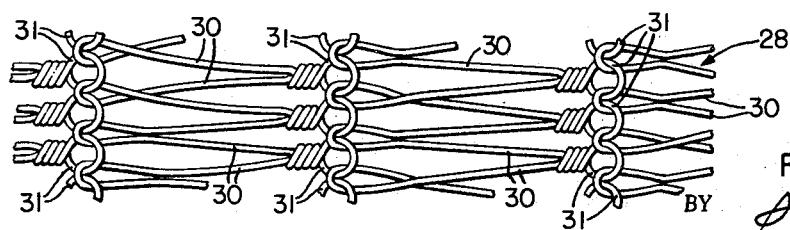
FIGURE 7 shows the constrictor of FIGURE 6 in a closed and locked position.

FIGURE 7 illustrates the position of the constrictor sheath 28 when the tube 23 has been stretched. It will be understood that the constrictor sheath 28 is made of ductile wire similar to that used for the constrictor sheath 3 which will lock the constrictor in the closed position upon elongation of the tube 23 thereby preventing it from reopening and permitting fluid to flow from the broken ends of the tube 23. An optional feature illustrated by FIGURE 4 is the use of a stabilizer or cover layer 34. Whether or not the layer 34 is used depends upon the particular purpose for which the tube 23 is designed. The tubes described herein are normally attached to suitable end fittings in such a manner that they will not pull loose from the fittings or be torn by the fittings prior to breaking of the tube due to elongation.

It will be understood that many variations may be made in the layers making up the fluid impervious conduit and in the materials used therefor. The main requirements of the conduit is that it be impervious to the liquid which it will carry and that it is capable of extremely high elongation and reduction in diameter before breaking.

In addition to the two types of constrictor sheaths described herein, it will be understood that other types of constrictors may also be used so long as they are compatible with the conduit. The primary criteria for the constrictor is that it will not prematurely restrict the flow of fluid through the conduit but will close in sufficient time to completely close off the conduit before the conduit breaks.

While the embodiments herein described do not show the various layers of the tubes bonded together by any adhesives, there may be some instances where it is desirable to bond at least part of the layers together by an adhesive which would fail under a predetermined load and therefore would not interfere with tube elongation.

Various changes can be made in the illustrative embodiments shown herein without departing from the scope of the invention.

What is claimed is:
1. A self-closing tube for fluids comprising:
   (A) a fluid impervious conduit having high elongation characteristics and being capable of a substantial reduction in diameter when elongated, and
   (B) a constrictor means surrounding the conduit to apply radially inward pressure against the conduit when it is elongated to further reduce the diameter thereof and at least substantially close the conduit prior to its breaking thereby preventing fluid loss.
2. A self-closing tube as claimed in claim 1 wherein the constrictor means is a sheath made of ductile wire which will lock in a constricted position and hold the broken portions of the conduit in a closed position even after one longitudinal segment of the constrictor sheath breaks away from another.
3. A self-closing tube as claimed in claim 2 wherein the constrictor sheath is made in a dual strand half hitch configuration.
4. A self-closing tube as claimed in claim 2 wherein the constrictor is a sheath which is comprised of a plurality of interlocking wire rings each of which is bent in an undulating pattern of a plurality of interconnected Y-shaped segments each having a loop at the bottom of the Y through which a portion of one of the Y-shaped segments of the next adjacent ring passes and upon elongation of the conduit and constrictor sheath, each Y-shaped member is drawn through one of the loops in the next adjacent ring thereby closing the open arms of each Y-shaped segment and reducing the diameter of the constrictor sheath.
5. A self-closing tube as claimed in claim 1 wherein the fluid impervious conduit comprises:
   (A) an elastomeric fluid impervious liner tube;
   (B) a reinforcing sheath of interwoven wire surrounding the liner tube, said sheath having high elongation characteristics and being capable of reduction in diameter during elongation; and
   (C) a woven cloth stabilizer layer surrounding the reinforcing sheath.
6. A self-closing tube as claimed in claim 1 wherein the fluid impervious conduit comprises:
   (A) a stretchable fluid impervious liner;
   (B) a circumferentially crinkled sheath surrounding the liner, said sheath being capable of high elongation due to a bellows-type action; and
   (C) an interwoven wire reinforcement sheath surrounding the crinkled sheath;
   (D) all of the aforesaid layers being capable of simultaneous high elongation and reduction in diameter.
7. A self-closing tube for fluids comprising:
   (A) a fluid imprevious conduit having high elongation characteristics which permit the conduit to be stretched longitudinally a substantial amount prior to breaking;
   (B) a constrictor means surrounding the conduit, said constrictor means constructed of elongated members interlaced in such a pattern that, upon elongation of the tube, the members will draw together in a "noose-like" action to reduce the circumference of the constrictor simultaneously with the increase in length of the tube and thereby close off the flow of fluid through the conduit prior to its breaking.
8. A self-closing tube as claimed in claim 7 wherein the elongated members of the constrictor are of ductile material which will cause the constrictor to lock in the closed position when the tube is elongated.

References Cited

UNITED STATES PATENTS

| | | | |
|---|---|---|---|
| 284,050 | 8/1883 | Nichols | 138—127 |
| 1,741,491 | 12/1929 | Ansell | 138—127 X |
| 3,384,089 | 5/1968 | Shriner | 138—178 X |

LOUIS K. RIMRODT, Primary Examiner